United States Patent [19]

Adcock et al.

[11] Patent Number: 4,480,147
[45] Date of Patent: Oct. 30, 1984

[54] CONTAMINANT TRAP FOR GAS-INSULATED APPARATUS

[75] Inventors: James L. Adcock; Marshall O. Pace, both of Knoxville; Loucas G. Christophorou, Oak Ridge, all of Tenn.

[73] Assignee: United States Department of Energy, Washington, D.C.

[21] Appl. No.: 463,209

[22] Filed: Feb. 2, 1983

[51] Int. Cl.³ .......................... H01B 9/06; H02G 5/06
[52] U.S. Cl. ..................................... 174/14 R; 134/42
[58] Field of Search ............ 174/14 R, 17 GF; 134/1, 134/42

[56] References Cited
U.S. PATENT DOCUMENTS 3,856,978  12/1974  Sletten et al. .................. 174/14 R
3,864,507  2/1975  Fox et al. ........................ 174/14 R Primary Examiner—Laramie E. Askin
Attorney, Agent, or Firm—Edwin D. Grant; Stephen D. Hamel; Michael F. Esposito

[57] ABSTRACT

A contaminant trap for a gas-insulated electrical conductor is provided. A resinous dielectric body such as Kel-F wax, grease or other sticky polymeric or oligomeric compound is disposed on the inside wall of the outer housing for the conductor. The resinous body is sufficiently sticky at ambient temperatures to immobilize contaminant particles in the insulating gas on the exposed surfaces thereof. An electric resistance heating element is disposed in the resinous body to selectively raise the temperature of the resinous body to a molten state so that the contaminant particles collected on the surface of the body sink into the body so that the surface of the resinous body is renewed to a particle-less condition and, when cooled, returns to a sticky collecting surface.

4 Claims, 1 Drawing Figure

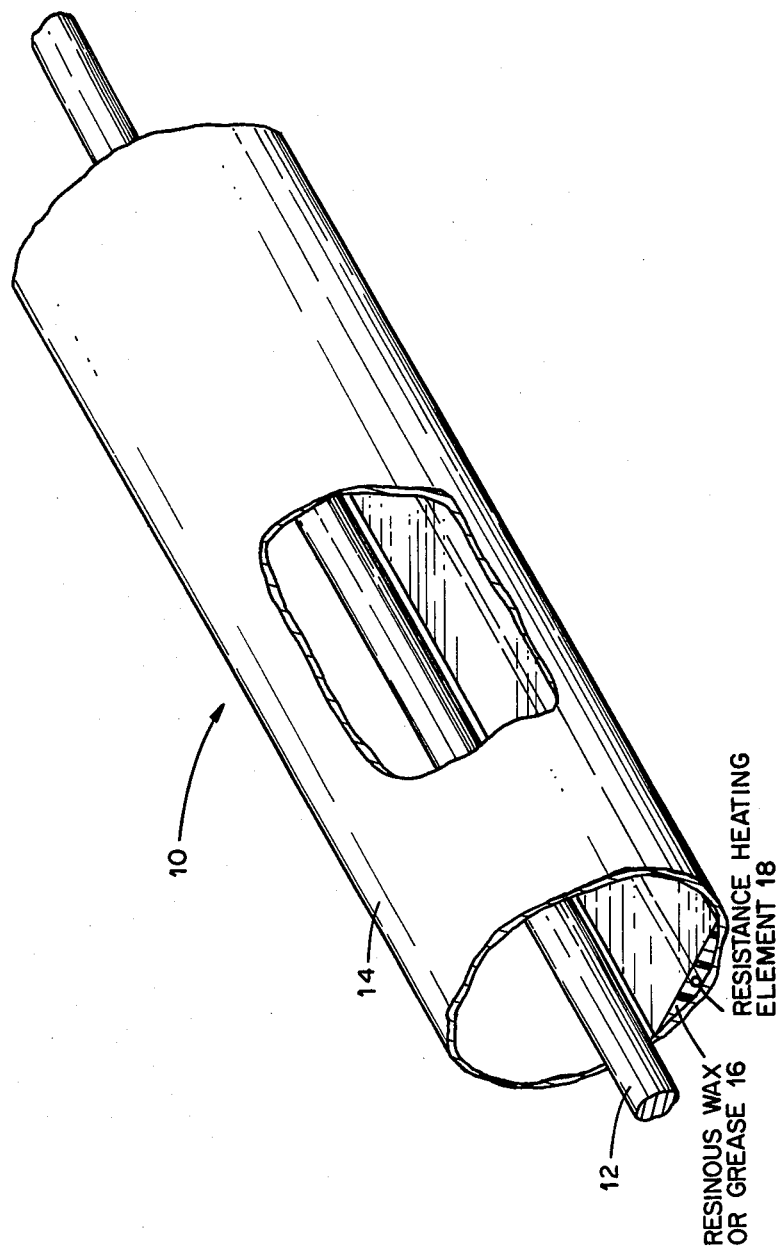

CONTAMINANT TRAP FOR GAS-INSULATED APPARATUS

BACKGROUND OF THE INVENTION

This invention, which resulted from a contract with the United States Department of Energy, relates generally to an improved gas-insulated, high-voltage electrical conductor and more particularly to such a conductor having therein a means for removing mobile electrically conductive and semiconductive particles which adversely affect the dielectric coefficient of the insulating gas of the conductor.

Gases having a high dielectric constant (e.g., $SF_6$) are placed in high-voltage conductors of the type having an inner conductor and an outer tubular housing concentrically spaced around said inner conductor, thereby initially preventing sparking between the inner conductor and the housing. However, it is known that during the use of such conductors small electrically conductive and semiconductive particles accumulate in the gas insulator and drastically reduce its insulating capacity.

SUMMARY OF THE INVENTION

A primary object of this invention is to provide a means for immobilizing particulate material which accumulates within the gas insulator of the above-described type of electrical conductor, thereby maintaining the insulating capacity of the gas at a high level.

A preferred embodiment of the invention comprises an electrical conductor, a tubular housing concentrically spaced around said conductor, a resinous body fixed to the inner surface of said housing, and an electric resistance heating element embedded in said resinous body.

DESCRIPTION OF THE DRAWING

The accompanying drawing is a pictorial view of a portion of a preferred embodiment of the invention.

DETAILED DESCRIPTION OF THE PREFERRED EMBODIMENT OF THE INVENTION

In the drawing, reference number 10 generally designates a gas-insulated electrical assembly constituting a preferred embodiment of the invention and comprising an electrical conductor 12 in the form of a wire. Disposed in concentrically spaced relation around conductor 12 is a tubular outer housing 14, and fixedly positioned against the inner surface of said housing is an elongate body 16 formed of a resinous dielectric substance such as Kel-F wax (a product of 3M Company), Halocarbon wax (a product of Halocarbon Products), grease, or other sticky polymeric and oligomeric compounds. The resinous body 16 preferably extends substantially along the entire length of the housing 14. An electric resistance heating element 18 in the form of a wire is embedded in body 16 and connected with a conventional source of electric current (not illustrated, the heating element also preferably extending substantially along the entire length of housing 14. A dielectric gas such as $SF_6$ fills the space between conductor 12 and housing 14.

OPERATION OF THE PREFERRED EMBODIMENT OF THE INVENTION

When conductor 10 is in use, particles such as bits of metal left from fabrication or produced during operation by friction would normally contaminate the dielectric gas within housing 14 and reduce its insulating capacity. However, in the illustrated assembly, these particles impinge on and are trapped by the resinous body 16. Electric current is passed through resistance heating element to raise its temperature and thereby either melt or soften resinous body 16.

Tests of the effectiveness of the invention were conducted with coaxial electrodes, the inner cylindrical electrode having a diameter of 1.5 cm, the outer tubular electrode having an inner diameter of 4 cm, and $SF_6$ gas being disposed between said electrodes. Contaminating particles were introduced into the $SF_6$ insulating gas in the form of copper wires having a diameter of 0.0381 cm and a length of 0.3175 cm, and the insulating gas was maintained under a pressure of 101.3 kPa. Results of two representative tests are presented in the following table.

TABLE I

| Test | Number of Particles Used | Control Method Applied | Breakdown Test Results Following Application of Control Method | | Observations |
| --- | --- | --- | --- | --- | --- |
| | | | No. of Breakdowns | Mean Breakdown Voltage | |
| 1 | 5 | Bounced particles with electrical stress at ambient temperature, sticking them on surface of Kel-F wax. | 30 | 58.6 kV | All particles stuck to wax. |
| 2 | 5 | With voltage off, heated electrodes to 90° C. for one hour and then cooled them down to ambient temperature. | 10 | 58.6 kV | All particles electrodes were embedded in deep wax. |

It will thus be seen that the herein disclosed invention is an effective means for removing contaminating particles from insulating gas in a high-voltage electrical apparatus. The use of resinous particle-trapping bodies having different temperature characteristics permits the use of the invention in electrical apparatus operated at widely different temperatures.

What is claimed is:

1. An electrical apparatus comprising:
an electrical conductor;
a housing spaced from said conductor;
a gas having a high dielectric constant disposed in the space between said conductor and said housing;
a resinous body disposed on the inside wall of said housing in a lowermost portion thereof, said resinous body being formed of a material which is sufficiently sticky at ambient temperature to immobilize contaminant particles accumulated in said gas on the exposed surfaces thereof and capable of being converted to a sufficiently molten state at elevated temperatures to allow said particles previously adhering to the said sticky surface to become completely embedded in said resinous body so that the sticky surface of said resinous body is renewed to a particle-less condition;

an electric resistance heating element disposed in said resinous body for selectively heating said body to said molten state.

2. The apparatus of claim 1 wherein said housing is tubular and concentrically spaced around said conductor.

3. The apparatus of claim 2 wherein said resinous body consists of wax.

4. The apparatus of claim 2 wherein said resinous body consists of grease.

* * * * *